(12) United States Patent
Bateman et al.

(10) Patent No.: US 10,846,417 B2
(45) Date of Patent: Nov. 24, 2020

(54) IDENTIFYING PERMITTED ILLEGAL ACCESS OPERATIONS IN A MODULE SYSTEM

(71) Applicant: Oracle International Corporation, Redwood Shores, CA (US)

(72) Inventors: Alan Bateman, Dublin (IE); Chris Hegarty, Dublin (IE); Alexander R. Buckley, Cupertino, CA (US); Brian Goetz, Williston, VT (US); Mark B. Reinhold, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 15/785,812

(22) Filed: Oct. 17, 2017

(65) Prior Publication Data

US 2018/0268158 A1 Sep. 20, 2018

Related U.S. Application Data

(60) Provisional application No. 62/473,254, filed on Mar. 17, 2017.

(51) Int. Cl.
*G06F 21/62* (2013.01)
*G06F 21/52* (2013.01)

(52) U.S. Cl.
CPC .......... *G06F 21/6218* (2013.01); *G06F 21/52* (2013.01); *G06F 21/629* (2013.01)

(58) Field of Classification Search
CPC ...... G06F 21/6218; G06F 21/83; G06F 21/52; G06F 21/629; H04L 63/083; H04L 63/102; H04L 63/10; H04L 63/145
(Continued)

(56) References Cited

U.S. PATENT DOCUMENTS 5,557,796 A * 9/1996 Fehskens ............... H04L 41/00
712/220
6,279,111 B1 * 8/2001 Jensenworth ......... G06F 21/335
713/159
(Continued)

FOREIGN PATENT DOCUMENTS

KR 20130119359 A * 10/2013 ............. G06F 21/10

OTHER PUBLICATIONS (SearchSecurity, honeypot (honey pot), https://web.archive.org/web/20170119045006/https://searchsecurity.techtarget.com/definition/honey-pot, Jan. 19, 2017, hereinafter SearchSecurity).*

(Continued)

*Primary Examiner* — Farid Homayounmehr
*Assistant Examiner* — Raied A Salman
(74) *Attorney, Agent, or Firm* — Invoke

(57) ABSTRACT

Techniques for identifying permitted illegal access operations in a module system are disclosed. An operation, expressed in a first module, that attempts to access a module element of a second module is identified. Based on a module declaration associated with the second module, the module element is determined inaccessible to the first module. Additionally or alternatively, based on an access modifier associated with the module element, the module element is determined inaccessible to the operation. The operation is determined as an illegal access operation. The illegal access operation is permitted to access the module element. A warning corresponding to the illegal access operation is generated.

30 Claims, 12 Drawing Sheets

(58) Field of Classification Search
USPC ............... 726/29; 714/38; 719/315; 385/650
See application file for complete search history.

(56) References Cited

U.S. PATENT DOCUMENTS

| | | | | |
|---|---|---|---|---|
| 7,596,570 | B1* | 9/2009 | Emigh | G06F 11/1453 |
| 9,047,455 | B2* | 6/2015 | Dietrich | G06F 21/445 |
| 9,087,216 | B2* | 7/2015 | LaFever | H04L 63/0414 |
| 9,614,852 | B2* | 4/2017 | Kiriyama | H04L 63/20 |
| 9,769,123 | B2* | 9/2017 | Grewal | G06F 21/52 |
| 10,078,497 | B2* | 9/2018 | Buckley | G06F 8/36 |
| 2002/0184214 | A1* | 12/2002 | Lucovsky | G06F 16/30 |
| 2003/0101381 | A1* | 5/2003 | Mateev | G06F 21/53 |
| | | | | 714/38.14 |
| 2005/0097550 | A1* | 5/2005 | Schwabe | G06F 9/44521 |
| | | | | 717/178 |
| 2008/0134207 | A1* | 6/2008 | Chamieh | G06F 9/4488 |
| | | | | 719/315 |
| 2011/0271251 | A1* | 11/2011 | Buckley | G06F 21/629 |
| | | | | 717/120 |
| 2013/0291059 | A1* | 10/2013 | Giambiagi | H04L 63/20 |
| | | | | 726/1 |
| 2015/0178494 | A1* | 6/2015 | Taratine | G06F 21/45 |
| | | | | 726/6 |
| 2015/0242606 | A1* | 8/2015 | Shin | G06F 21/31 |
| | | | | 713/182 |
| 2016/0261582 | A1* | 9/2016 | Lee | G06F 21/31 |
| 2017/0061148 | A1* | 3/2017 | Buckley | G06F 21/6218 |
| 2017/0063874 | A1* | 3/2017 | Buckley | G06F 9/4488 |
| 2017/0149787 | A1* | 5/2017 | Niemela | H04L 63/10 |
| 2018/0173386 | A1* | 6/2018 | Adika | G06F 16/957 |
| 2018/0239630 | A1* | 8/2018 | Buck | H04L 63/0263 |
| 2018/0268158 | A1* | 9/2018 | Bateman | G06F 21/629 |
| 2019/0207946 | A1* | 7/2019 | Mertens | G06F 21/6218 |

OTHER PUBLICATIONS

Detlef Sturm, et al., Permission path analysis based on access intelligence, SACMAT '13: Proceedings of the 18th ACM symposium on Access control models and technologies, Jun. 2013, pp. 253-256.*

* cited by examiner

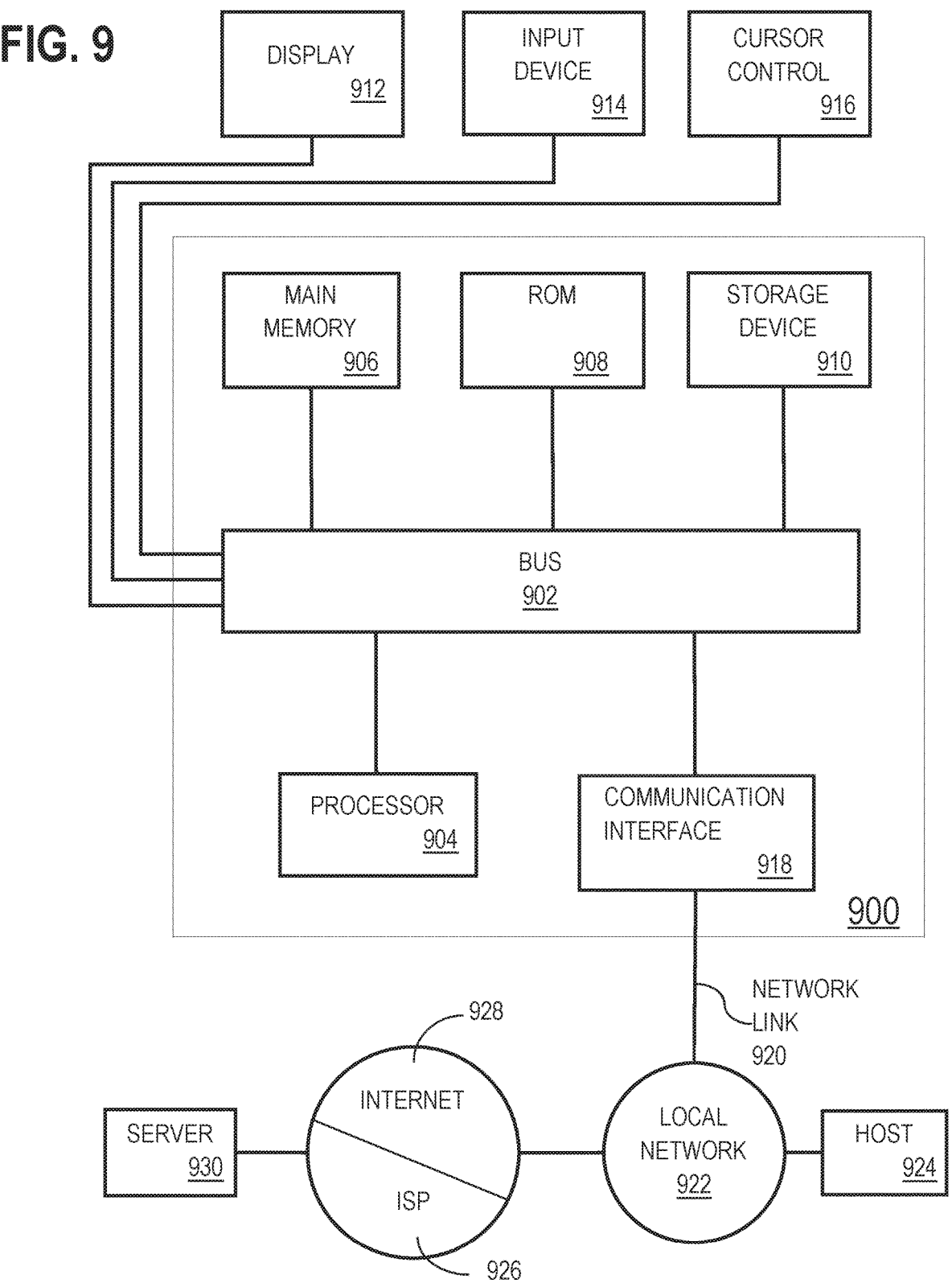

IDENTIFYING PERMITTED ILLEGAL ACCESS OPERATIONS IN A MODULE SYSTEM

BENEFIT CLAIMS; INCORPORATION BY REFERENCE

This application claims the benefit of U.S. Provisional Patent Application 62/473,254, filed Mar. 17, 2017, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to access control. In particular, the present disclosure relates to identifying permitted illegal access operations in a module system.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 illustrates a system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MODULES
   3.1 MODULE DECLARATIONS
   3.2 MODULE DEPENDENCIES
   3.3 MODULAR-LEVEL ACCESS CONTROL
   3.4 MIGRATION
4. LANGUAGE-LEVEL ACCESSIBILITY
5. STRICTLY ENFORCING MODULAR-LEVEL ACCESSIBILITY AND LANGUAGE-LEVEL ACCESSIBILITY
6. IDENTIFYING PERMITTED ILLEGAL ACCESS OPERATIONS IN A MODULE SYSTEM
7. MISCELLANEOUS; EXTENSIONS
8. HARDWARE OVERVIEW

1. General Overview

One or more embodiments include identifying permitted illegal access operations in a module system. An operation, expressed in a first module, that attempts to access a module element of a second module is identified. Based on a module declaration associated with the second module, the module element is determined inaccessible to the first module. Additionally or alternatively, based on an access modifier associated with the module element, the module element is determined inaccessible to the operation. The operation is determined as an illegal access operation. The illegal access operation is permitted to access the module element. A warning corresponding to the illegal access operation is generated.

One or more embodiments described in this Specification and/or recited in the claims may not be included in this General Overview section.

2. Architectural Overview

Figure 1:
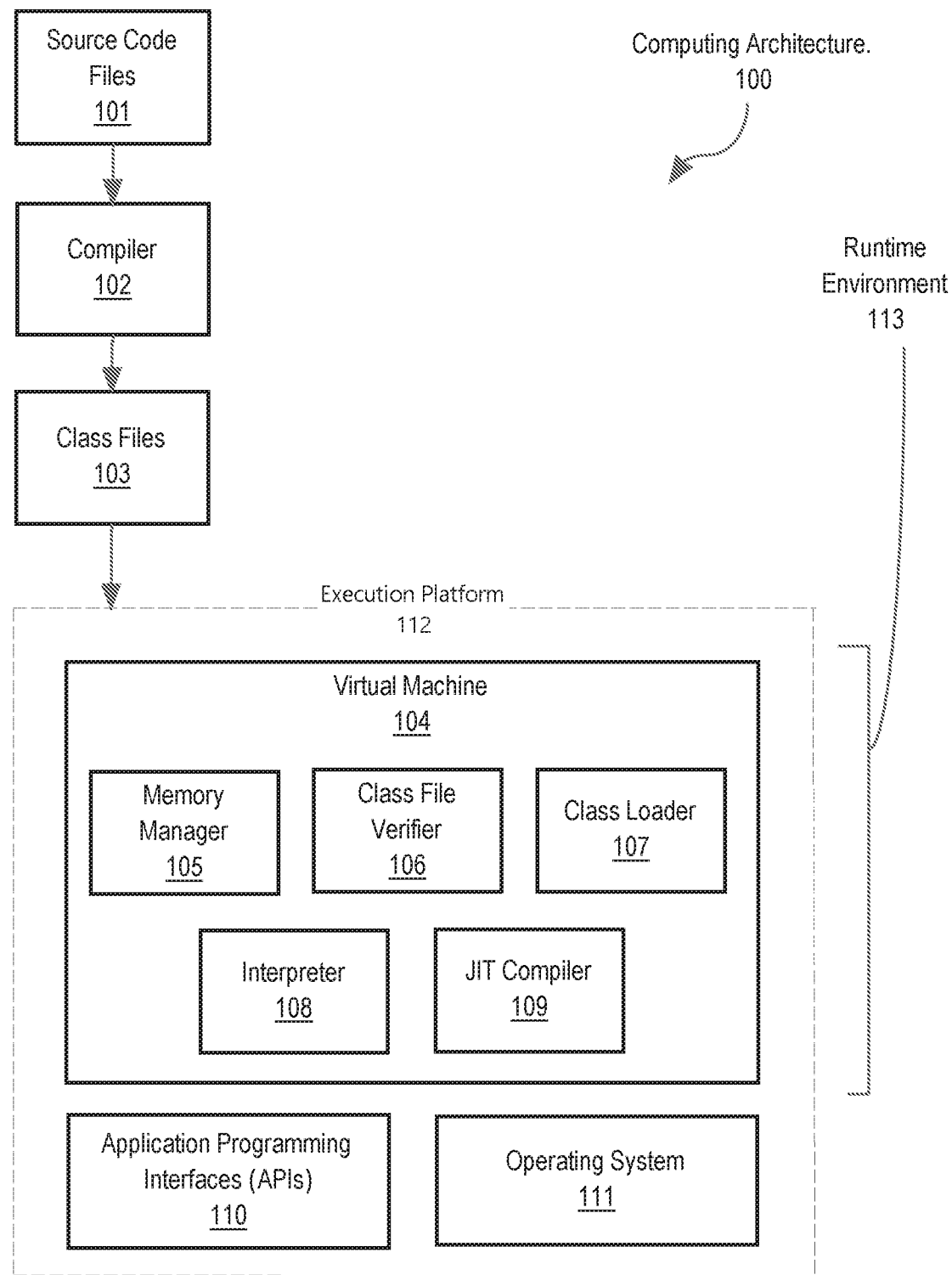
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/ output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
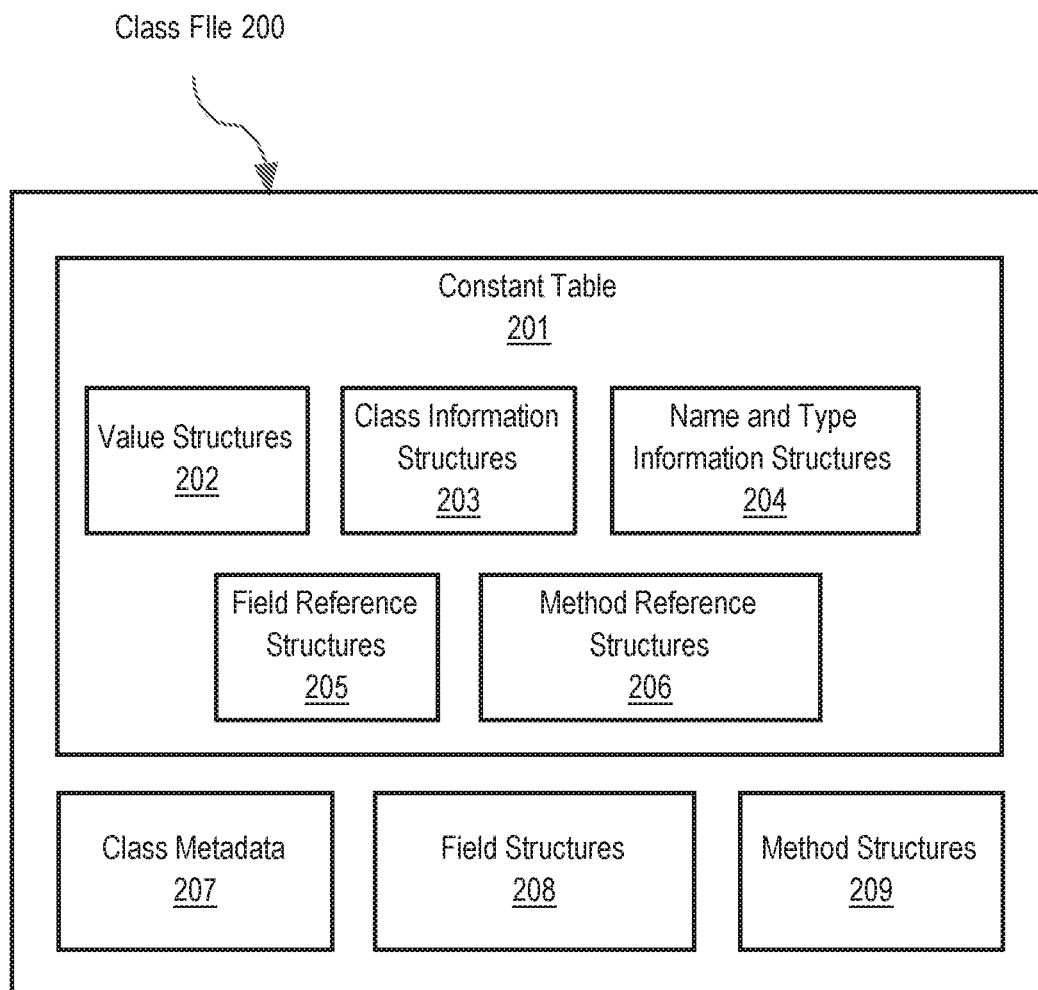
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
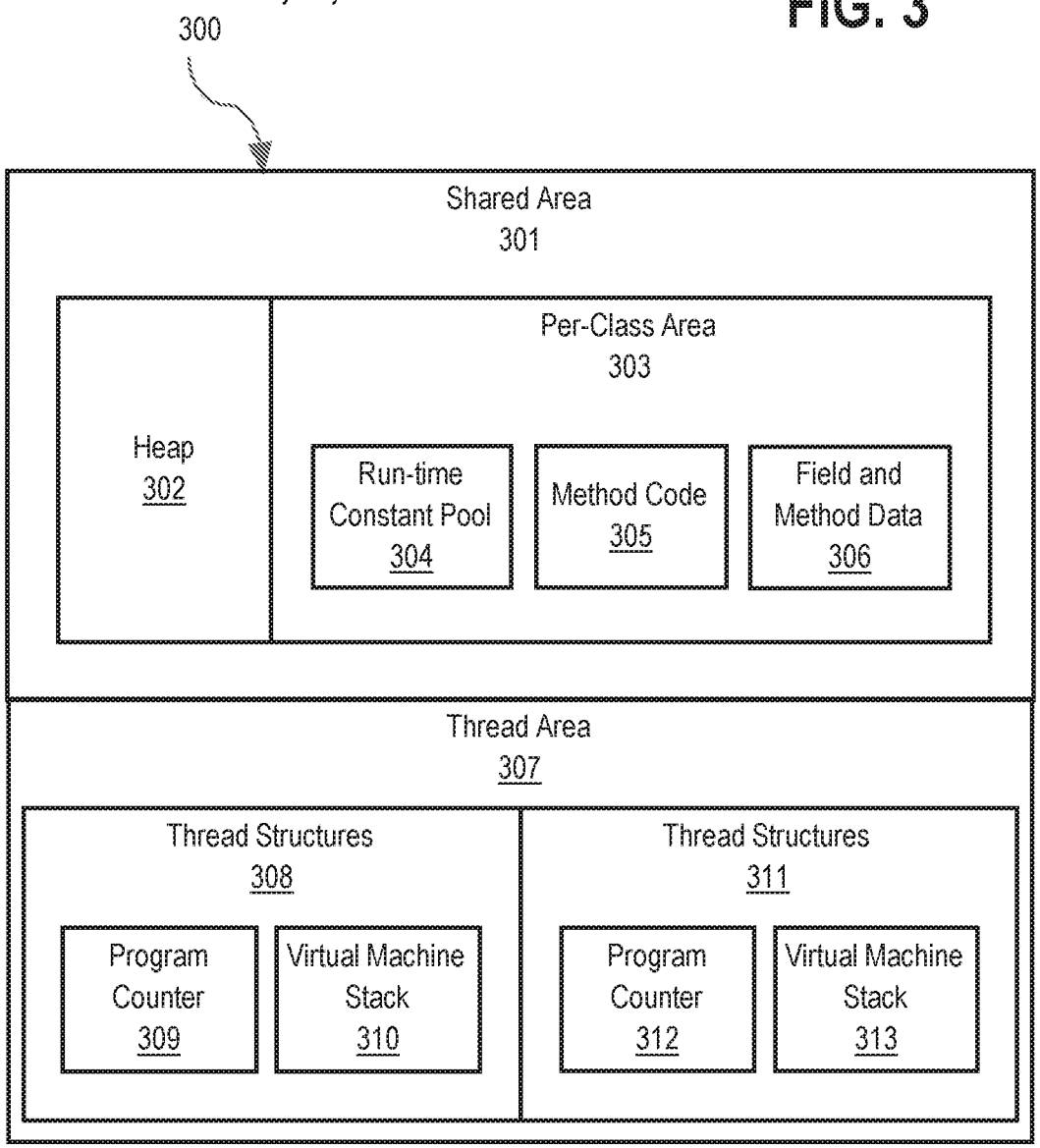
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
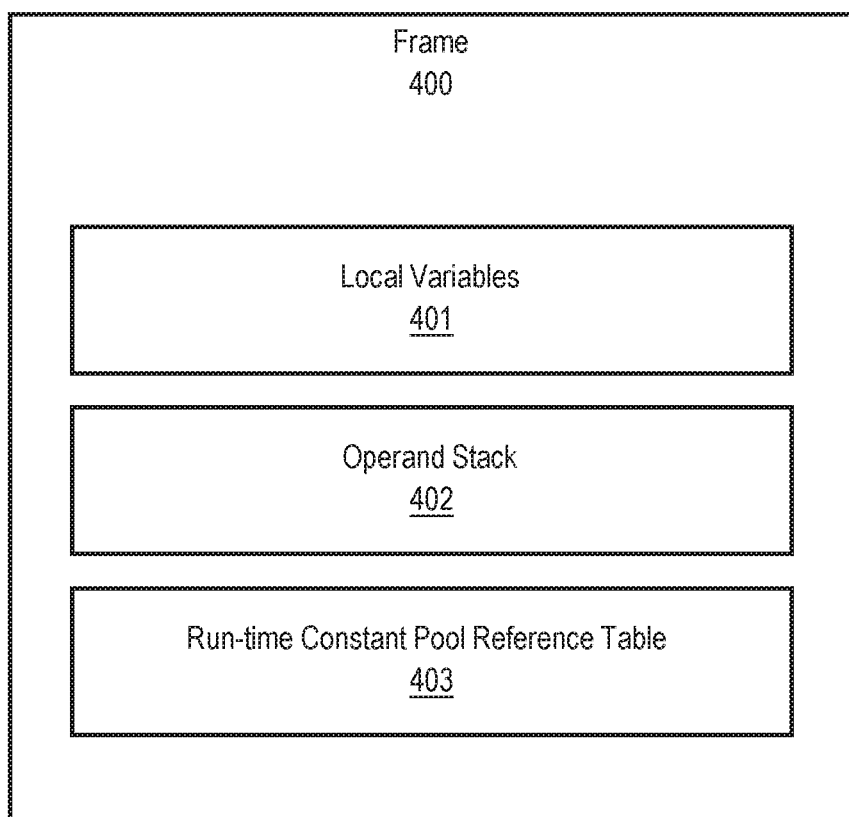
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Modules 3.1 Module Declarations

In one or more embodiments, a named explicit module is a self-describing collection of code and/or data. (Named explicit modules and other types of modules are further described below in Section 3.4, entitled "Migration.") The code is organized as a set of one or more packages (also referred to herein as "libraries"). Each package includes one or more types (such as classes and interfaces). A particular module's self-description is expressed in the particular module's module declaration. The particular module's self-description explicitly indicates at least one or more of the following:

(a) the name (or other reference) of the particular module;
(b) one or more other modules on which the particular module depends (module dependencies are further described below in Section 3.2, entitled "Module Dependencies"); and
(c) one or more packages and/or types of the particular module that are accessible to other modules (accessibility and exportation are further described below in Section 3.3, entitled "Access Control").

3.2 Module Dependencies

In one or more embodiments, a module dependency is a dependency indicated by a first module on a second module, whereby the second module must be present in order for the first module to be compiled and/or executed. For example, if a type associated with Module A references a type associated with Module B, then Module A must indicate a module dependency on Module B in order to be compiled and executed.

The declaration of a named explicit module indicates the module dependencies of the named explicit module by using, for example, a requires clause. For example, the declaration of Module A may use, "requires B," to indicate a module dependency on Module B.

Module dependencies may be illustrated in a module graph. In a module graph, each module is represented by a node. A dependency between a first module and a second module is represented by an edge between a node representing the first module and a node representing the second module. The edge may also be labeled with the type of the corresponding dependency.

Figure 5A:
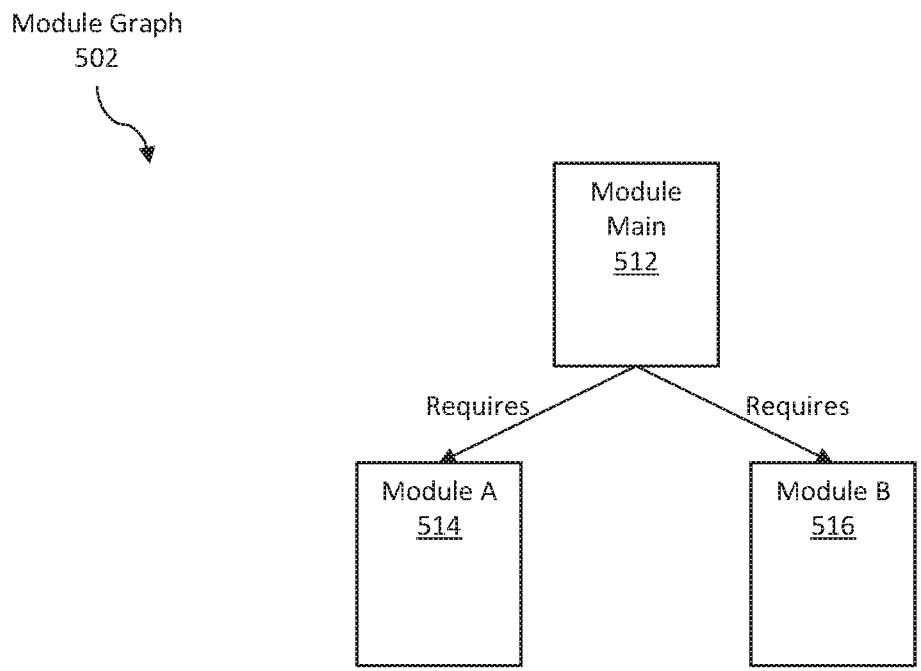
FIGS. 5A-B illustrate examples of module graphs, in accordance with one or more embodiments.

FIG. 5A illustrates an example of a module graph, in accordance with one or more embodiments. A module graph 502 illustrates module dependencies corresponding to Module Main 512. Module Main 512 is used as an initial module for the module graph 502. Module Main 512 includes a type that includes a method that serves as an application's entry point. In Java, for example, the default entry point method is called main. In other examples, a module graph may be determined using another module as an initial module. For example, a module that is required by Module Main 512 may be used as an initial module for a module graph. Examples described herein related to Module Main 512 may be equally applicable to any other module. Module Main 512 is referred to herein for purposes of explanation.

In this example, Module Main 512 is associated with the following module declaration:

```
module Main {
    requires A;
    requires B;
}
```

Module Main 512 is drawn as an initial node in the module graph 502. Based on the requires clauses of Module Main 512, an edge is drawn from Module Main 512 to Module A 514. Additionally, an edge is drawn from Module Main 512 to Module B 516. Each edge is labeled "Requires," and points away from Module Main 512. The module graph 502 indicates that there is a module dependency from Module Main 512 to each of Module A 514 and Module B 516.

The module graph 502 may be expanded by recursively examining each module already identified in the module graph 502. The module declaration of Module A 514 may be examined. Based on the requires clauses of Module A 514, further nodes and edges stemming from the node representing Module A 514 may be added to the module graph 502. Similarly, the module declaration of Module B 516 may be examined. Based on the requires clauses of Module B 516, further nodes and edges stemming from the node representing Module B 516 may be added to the module graph 502.

The term "transitive closure of module dependencies" corresponding to Module Main 512 includes all module dependencies that may be identified by recursively examining each module already identified in the module graph 502. The term "a set of modules in the transitive closure of module dependencies" corresponding to Module Main 512 refers to all modules that may be identified by recursively examining each module already identified in the module graph 502 (excluding Module Main 512 itself). The set of modules in the transitive closure of module dependencies corresponding to Module Main 512 includes all modules represented in the module graph 502, except Module Main 512, after the expansion of the module graph 502 is complete.

As described in the above example, Module Main 512 requires Module A 514 and Module B 516. Continuing the example, Module A 514 may require Module C and Module D (not illustrated). Each of Module C and Module D do not require any other modules. Module B 516 may require Module E (not illustrated). Module E does not require any other modules. Then a set of modules in the transitive closure of module dependencies corresponding to Module Main 512 is: Module A 514, Module B 516, Module C, Module D, and Module E.

3.3 Modular-Level Access Control

In one or more embodiments, there are at least three aspects to modular-level access control: observability, readability, and accessibility. Further descriptions of access control and/or encapsulation boundaries are included in U.S. patent application Ser. No. 14/847,800, filed Sep. 8, 2015, and U.S. patent application Ser. No. 14/847,833, filed Sep. 8, 2015; each of which is incorporated by reference in its entirety.

3.3.1 Observability

In one or more embodiments, a module is "observable" if a compiler or virtual machine (such as, JVM) is able to find the module. Observable modules include, for example, (1) named modules built into the compile-time environment and/or runtime environment 113 (which may be stored in a runtime image), (2) named modules included in modular artifacts associated with a particular repository (such as, a module path), and (3) an unnamed module associated with another repository (such as, a class path). (Different types of modules are further described below in Section 3.4, entitled "Migration.") Types that are within packages of observable modules are referred to herein as "observable types."

In an embodiment, a repository is a location (such as, a URL) that includes one or more class files. Different class loaders may load types from different repositories. Examples of repositories include a module path and a class path.

A module path is an ordered list of entries that is defined by a host system. Each entry identifies a location (such as, a URL) of one or more module artifacts and/or directories including module artifacts. As an example, a module path for a particular class loader may be defined in a—module-path statement or a—module-path in a command line.

A module artifact includes class files of the types associated with the packages of a particular module. The module artifact also includes the module declaration of the particular module. The module artifact may be a compressed version of the contents. Various formats may be used to store a module artifact, including but not limited to a Java Archive (JAR) file format, ZIP file format, and JMOD file format. A module artifact may also be referred to herein as a "module source."

A class path is an ordered list of entries defined by a host system. Each entry identifies a location (such as, a URL) of one or more types, directories including types, and/or artifacts including types. As an example, a class path for a particular class loader may be defined in a—cp statement or—classpath statement in a command line, and/or a CLASSPATH environment variable of a development toolkit.

The modules that are observable within a particular repository may be modified by a host system. For example, the modules that are observable from a module path may be modified by a—limitmods statement or a—limit-modules statement in a command line. The command line may be used to remove specific modules that are found in the module path from the set of observable modules. As an example, limiting the observable modules may be useful for debugging. As another example, limiting the observable modules reduces the number of modules resolved when the main module is the unnamed module defined by the application class loader for the application class path.

3.3.2 Readability

In one or more embodiments, a first module is "readable" to a second module if the second module explicitly or implicitly depends on the first module. (Implicit dependency is further described below in Section 3.4, entitled "Migration.") Given an initial observable module with one or more explicit dependencies, the runtime environment 113 performs resolution to determine a module graph of the module dependencies and/or a transitive closure of the module dependencies. During resolution, the runtime environment 113 locates a first set of observable modules to fulfill the explicit dependencies of the initial observable module. The runtime environment 113 locates a second set of observable modules to fulfill the explicit and/or implicit dependencies of the first set of modules. The runtime environment 113 recursively fulfills the explicit and/or implicit dependencies of all observable modules already identified in the module graph. The module graph and the transitive closure of module dependencies are further described above in Section 3.2, entitled "Module Dependencies."

3.3.3 Modular-Level Accessibility

In one or more embodiments, a first type of a first module is "accessible," on a modular level, to a second type of a second module if (1) the second module explicitly or implicitly depends on the first module, and (2) the first module explicitly or implicitly exports the package including the first type. (In an embodiment, in order for the second type of the second module to access a particular member of the first type of the first module, the following need to be true: (a) the first type of the first module is accessible, on a modular level, to the second type of the second module, and (b) the particular member of the first type of the first module is accessible, on a language level, to the second type of the second module. Language-level accessibility is further discussed below in Section 4, entitled, "Language-Level Accessibility.")

A named explicit module explicitly indicates the named explicit module's exportations. A module declaration may indicate an exportation using, for example, an exports clause, an opens clause, and/or an open modifier.

The exports clause may identify one or more packages of a particular module that are exported to other modules. As an example, a module declaration of Module A (which includes Package P) may include, "exports P," to indicate that types within Package P may be accessible to other modules.

The opens clause, used in association with a particular package of a module, may identify one or more packages of the particular module that are exposed to other modules at runtime. Based on the opens clause, public types in the particular package, and public members of the public types, are accessible to code in other modules at runtime. Based on the opens clause, all types in the particular package, and all their members, are accessible via the reflective operations.

The open modifier, used in association with a particular module, may indicate that all packages of the module are exposed to other modules at runtime. Additionally, based on the open modifier, all types in the particular module, and all their members, are accessible via the reflective operations.

In one or more embodiments, the runtime environment 113 strictly enforces the modular-level accessibility of types. A particular type is not allowed to access another type that is not accessible to the particular type. If a type of one module references another type of another module that is not accessible, then the runtime environment 113 causes an error to be thrown.

In one or more embodiments, a configuration may be provided to override the strict enforcement of modular-level accessibility. The configuration may be defined in various ways, such as by a host system (e.g., via a command line option), by an explicit operation within the code (e.g., the explicit operation may be suitably privileged code), and/or by an annotation (e.g., the annotation may be applied to a module's declaration). An operation in a first type that is permitted to access a second type based on the overriding configuration may be referred to as a "permitted illegal access operation." Steps for overriding the strict enforcement of modular-level accessibility and identifying permitted illegal access operations are described below in Section 6, entitled "Identifying permitted illegal access operations."

3.4 Migration

Code that is not associated with any module declarations may be referred to as "non-module code." Non-module code may be code that was written without modules in mind. For example, non-module code may be legacy code written prior to the introduction of the module system. In order to accommodate the use and migration of non-module code into the module system, there are two types of modules (in addition to the named explicit module, described above in Section 3.1, entitled "Module Declarations"): unnamed modules, and named automatic modules.

In an embodiment, an unnamed module includes one or more types (1) whose package(s) are not defined in any named explicit module and (2) that are loaded from a particular repository (such as, a class path), which is defined by the host system.

The unnamed module does not include any explicit module declaration. The unnamed module includes an implicit dependency to every other module in the module system. The unnamed module includes an implicit exportation of all of its packages. However, a named explicit module is not allowed to depend on an unnamed module.

In an embodiment, a named automatic module (also referred to herein as an "automatic module") includes one or more types (1) whose package(s) are not defined in any named explicit module and (2) that are loaded from a module path.

The automatic module does not include any explicit module declaration. The automatic module includes an implicit dependency to every other module in the module system. The automatic module includes an implicit exportation of all of its packages. A module declaration, indicating the implicit dependencies and/or exportations, may but is not necessarily generated for the automatic module at runtime. Meanwhile, a named explicit module is allowed to depend on a named automatic module.

Figure 5B:
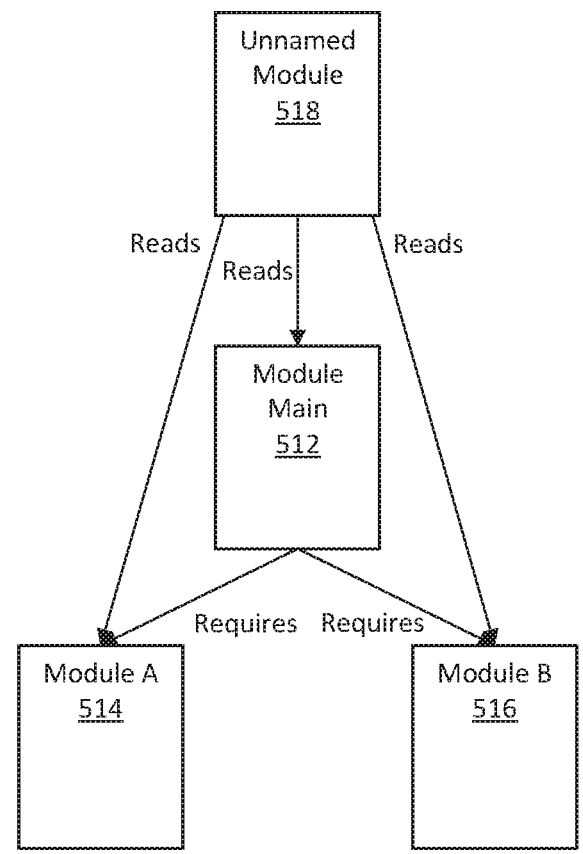

FIG. 5B illustrates an example of a module graph, in accordance with one or more embodiments. Referring back to FIG. 5A as an example, Module Main 512 is associated with the following module declaration:

---

```
module Main {
    requires A;
    requires B;
}
```

---

In FIG. 5B, Module Main 512, Module A 514, and Module B 516 are included as illustrated in FIG. 5A. Additionally, there is an unnamed module 518. The unnamed module 518 implicitly depends on every other module in the module system. The unnamed module 518 is said to "read" every other module in the module system. Hence, an edge is drawn from the unnamed module 518 to each of Module Main 512, Module A 514, and Module B 516. Each edge is labeled "reads."

4. Language-Level Accessibility

In one or more embodiments, a particular member (such as, a field and/or a method) of a first type is "accessible," on a language level, to a second type depending on access modifiers associated with the particular member. Access modifiers associated with the particular member include: (a) an access modifier of the first type (which includes the particular member), and (b) an access modifier of the particular member. (In an embodiment, the first type may be associated with a first module, and the second type may be associated with a second module. In order for the second type of the second module to access the particular member of the first type of the first module, the following need to be true: (a) the first type of the first module is accessible, on a modular level, to the second type of the second module, and (b) the particular member of the first type of the first module is accessible, on a language level, to the second type of the second module. Modular-level accessibility is further discussed above in Section 3.3, entitled, "Modular-Level Accessibility.")

Examples of access modifiers of the first type include: public, and package-private. (package-private may be implied if there is no explicit access modifier specified for the first type.) If the first type is public, then any type may access the first type. If the first type is package-private, then only types within the same package as the first type may access the first type.

Examples of access modifiers of the particular member of the first type include: public, package-private, or private. (package-private may be implied if there is no explicit access modifier specified for the particular member.) If the particular member is public, then any type may access the particular member. If the particular member is package-private, then only types within the same package as the first type may access the particular member. If the particular member is private, then no other type may access the particular member.

In one or more embodiments, the runtime environment 113 strictly enforces the language-level accessibility of members. A particular type is not allowed to access a particular member of another type that is not accessible to the particular type. If a type references a member of another type that is not accessible, then the runtime environment 113 causes an error to be thrown.

In one or more embodiments, a configuration may be provided to override the strict enforcement of language-level accessibility. The configuration may be defined in various ways, such as by a host system (e.g., via a command line option), by an explicit operation within the code, and/or by an annotation. An operation in a first type that is permitted to access a particular member of a second type based on the overriding configuration may be referred to as a "permitted illegal access operation." Steps for overriding the strict enforcement of language-level accessibility and identifying permitted illegal access operations are described below in Section 6, entitled "Identifying permitted illegal access operations."

As an example, a configuration to override the strict enforcement of language-level accessibility may be used in association with a reflective operation. A caller module may include a particular type whose code invokes a reflective operation. The reflective operation is performed on a private member of a particular instantiated object. Based on language-level accessibility requirements, the reflective operation should not be permitted to access the private member. However, prior to the invocation to the reflective operation, the system may execute code that sets the configuration to override the strict enforcement of language-level accessibility. The code that sets the configuration may be in the same type and/or module as the code that invokes the reflective operation, or may be in a different type and/or module from the code that invokes the reflective operation. Based on the overriding configuration, the reflective operation is permitted to access the private member. The reflective operation may be referred to as a "permitted illegal access operation."

As another example, a configuration to override the strict enforcement of language-level accessibility may be set by an operation that is itself an illegal access operation. The operation to set the configuration may be performed on a private member of a particular instantiated object. Based on language-level accessibility requirements, the configuration operation should not be permitted to access the private member. However, based on the configuration operation itself, the system recognizes that strict enforcement of language-level accessibility should be overridden. Accordingly, the configuration operation is permitted to access the private member. The configuration operation may be referred to as a "permitted illegal access operation."

As another example, a caller module may include (a) an operation to set the configuration to override enforcement of language-level accessibility and (b) a reflective operation. The configuration operation may be performed on a private member of one object. The reflective operation may be performed on a private member of another object. Based on the configuration operation, both the configuration operation and the reflective operation may be permitted. Both operations may be referred to as "permitted illegal access operations."

Figure 6:
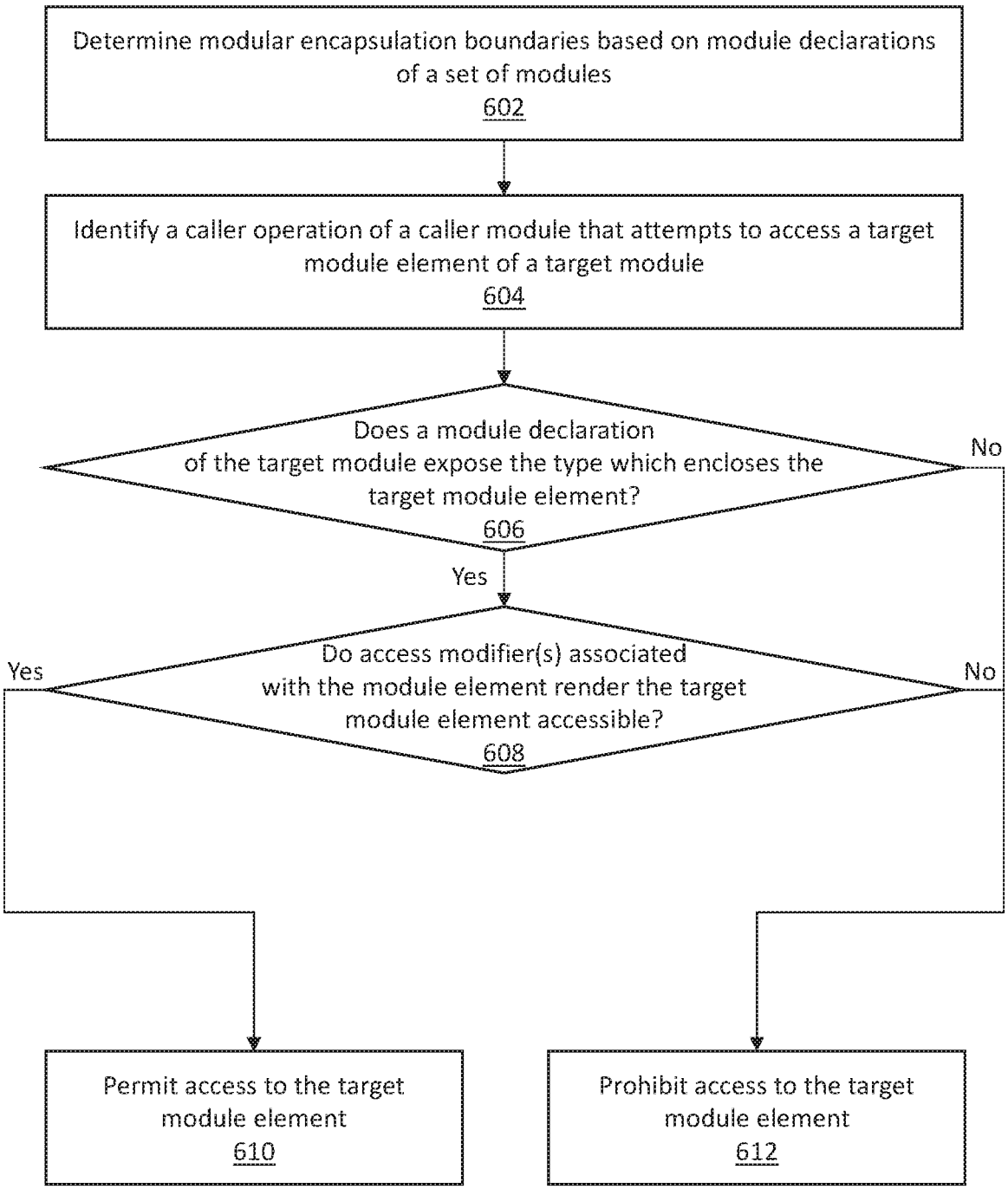
FIG. 6 illustrates an example set of steps for strictly enforcing modular-level accessibility and language-level accessibility, in accordance with one or more embodiments.

5. Strictly Enforcing Modular-Level Accessibility and Language-Level Accessibility FIG. 6 illustrates an example set of steps for strictly enforcing modular-level accessibility and language-level accessibility in a module system, in accordance with one or more embodiments. One or more steps illustrated in FIG. 6 may be modified, rearranged, or omitted all together. Accordingly, the particular sequence of steps illustrated in FIG. 6 should not be construed as limiting the scope of one or more embodiments.

In an embodiment, modular-level accessibility and language-level accessibility are strictly enforced, as described below with reference to FIG. 6, if there is no configuration to identify and generate warnings corresponding to permitted illegal access operations. The configuration to identify and generate warnings corresponding to permitted illegal access operations may be defined in various ways, such as by a host system (e.g., via a command line option), by an explicit operation within the code, and/or by an annotation.

One or more embodiments include determining modular encapsulation boundaries based on module declarations of a set of modules (Step 602). A runtime environment 113 analyzes the module declarations of the set of modules. The runtime environment 113 identifies module dependences amongst the set of modules. As an example, a module may depend on another module using a requires clause in a module declaration. Additionally or alternatively, the runtime environment 113 identifies packages of each module that are exposed by the corresponding module declaration.

As an example, a module may expose a particular package using an exports clause or an opens clause in a module declaration.

One or more embodiments include identifying a caller operation of a caller module that attempts to access a target module element of a target module (Step 604). The runtime environment 113 identifies the caller operation, which is expressed in the code of a particular type of the caller module. The caller operation attempts to access a target module element, which is declared in a particular type of the target module. The target module element may be, for example, a field and/or method of the particular type of the target module.

One or more embodiments include determining whether a module declaration of the target module exposes the type which encloses the target module element to the caller module (Step 606). In an embodiment, the runtime environment 113 refers to the modular encapsulation boundaries determined at Step 602 to determine whether the target module exposes the type which encloses the target module element to the caller module. In another embodiment, the runtime environment 113 directly analyzes the module declaration of the target module itself to determine whether the module declaration of the target module exposes the type which encloses the target module element to the caller module. The analysis of the module declaration is performed without regard to the encapsulation boundaries determined at Step 602.

One or more embodiments include determining whether one or more access modifiers associated with the target module element render the target module element accessible to the type including the caller operation (Step 608). The runtime environment 113 analyzes the code of the target module to determine access modifiers associated with the target module element. An access modifier may be explicitly expressed within the code of the target module. Alternatively, an access modifier may be implied based on a lack of an explicit access modifier within the code of the target module. As described above in Section 4, entitled "Language-Level Accessibility," access modifiers associated with the target module element include: (a) an access modifier of the type including the target module element, and (b) an access modifier of the target module element. The runtime environment 113 determines whether the access modifiers associated with the target module element render the target module element accessible to the type including the caller operation.

If the module declaration of the target module exposes the type which encloses the target module element and access modifiers associated with the target module element render the target module element accessible, then one or more embodiments including permitting access to the target module element (Step 610). The runtime environment 113 executes the caller operation. As part of executing the caller operation, the runtime environment 113 accesses the target module element.

If the module declaration of the target module does not expose the type which encloses the target module element, or access modifiers associated with the target module element do not render the target module element accessible, then one or more embodiments including prohibiting access to the target module element (Step 612). The runtime environment 113 does not execute the caller operation. The runtime environment 113 causes an error to be thrown.

6. Identifying Permitted Illegal Access Operations in a Module System

Figure 7A:
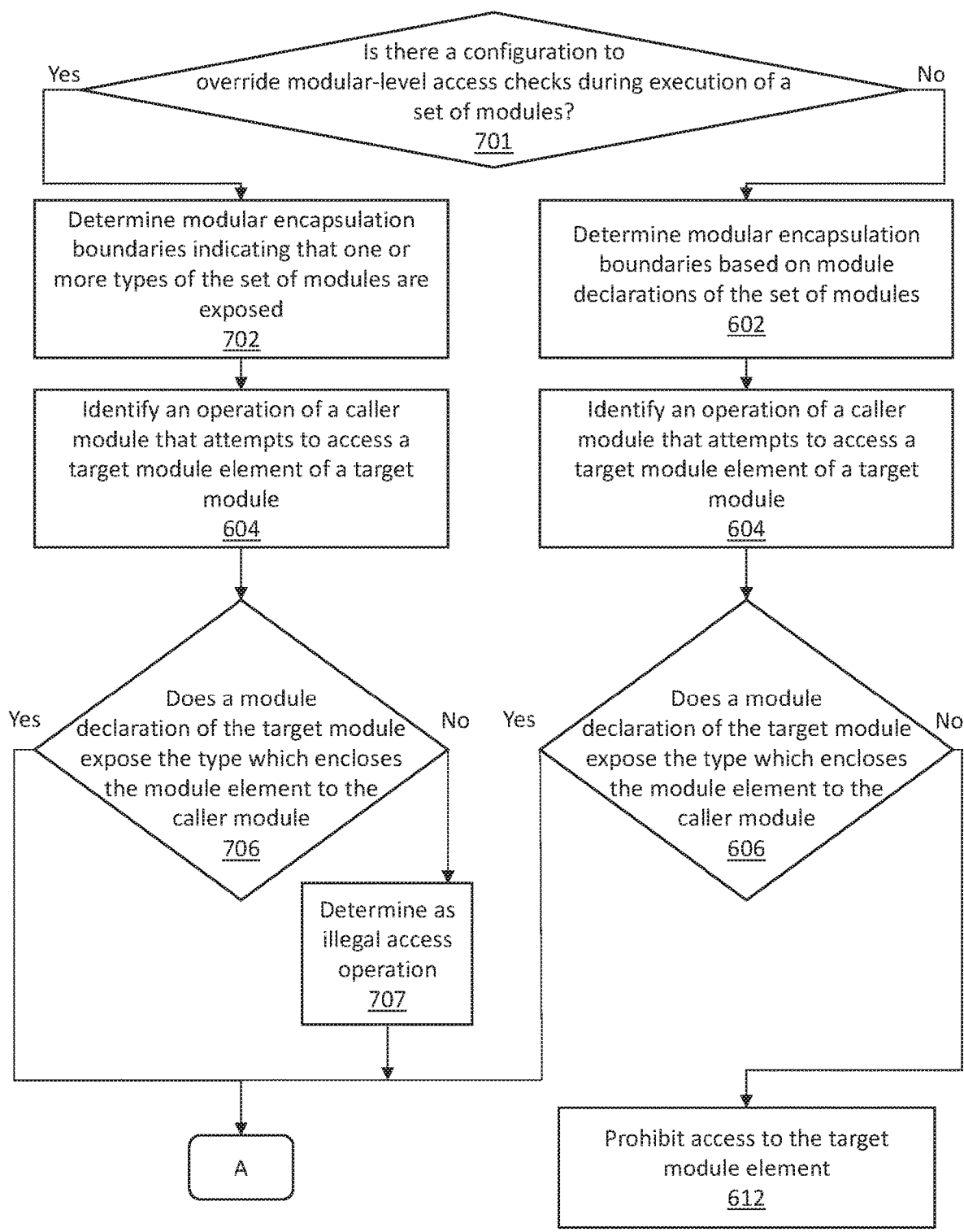
FIGS. 7A-C illustrate an example set of steps for identifying permitted illegal access operations in a module system, in accordance with one or more embodiments.
Figure 7B:
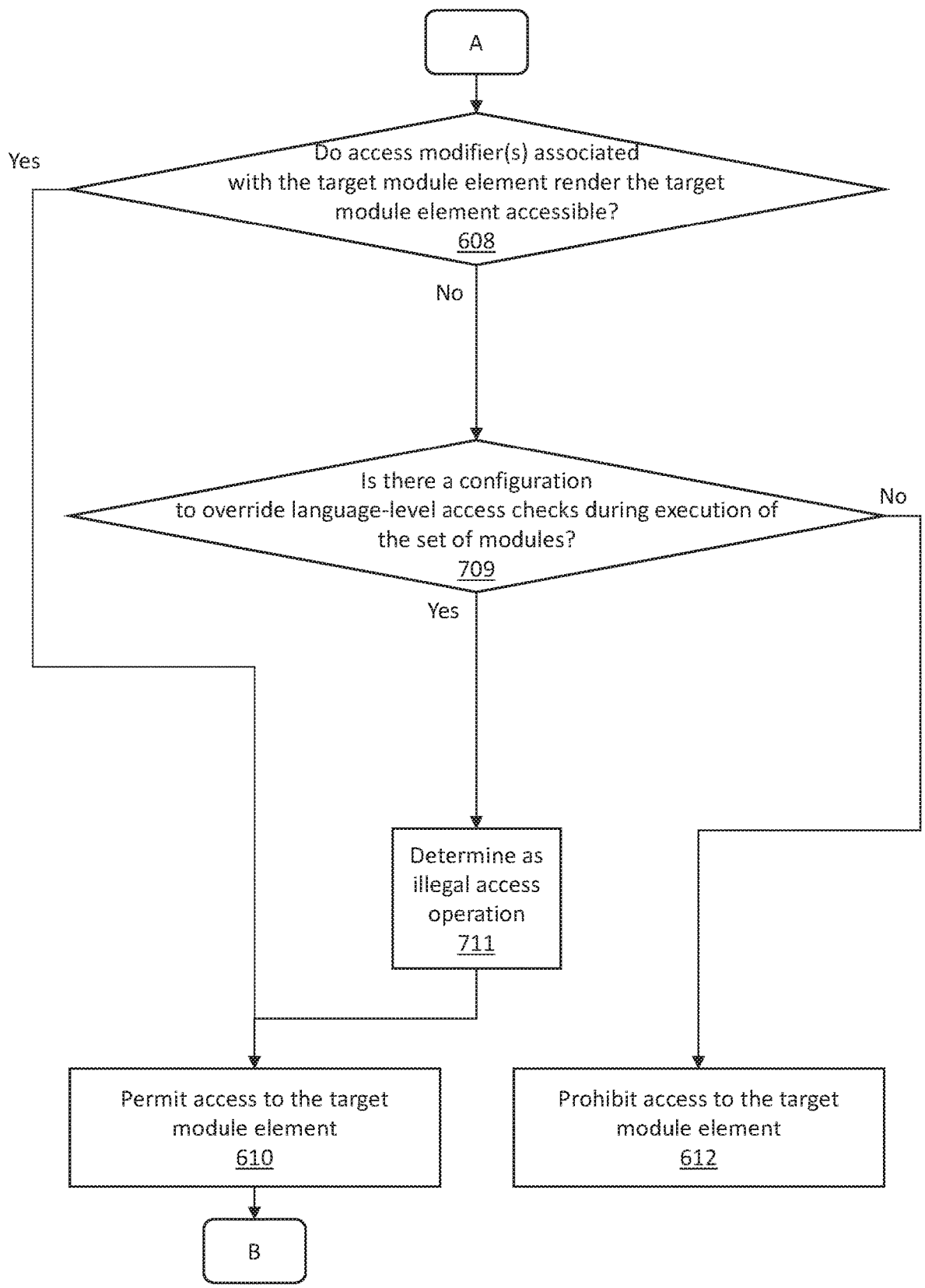
Figure 7C:
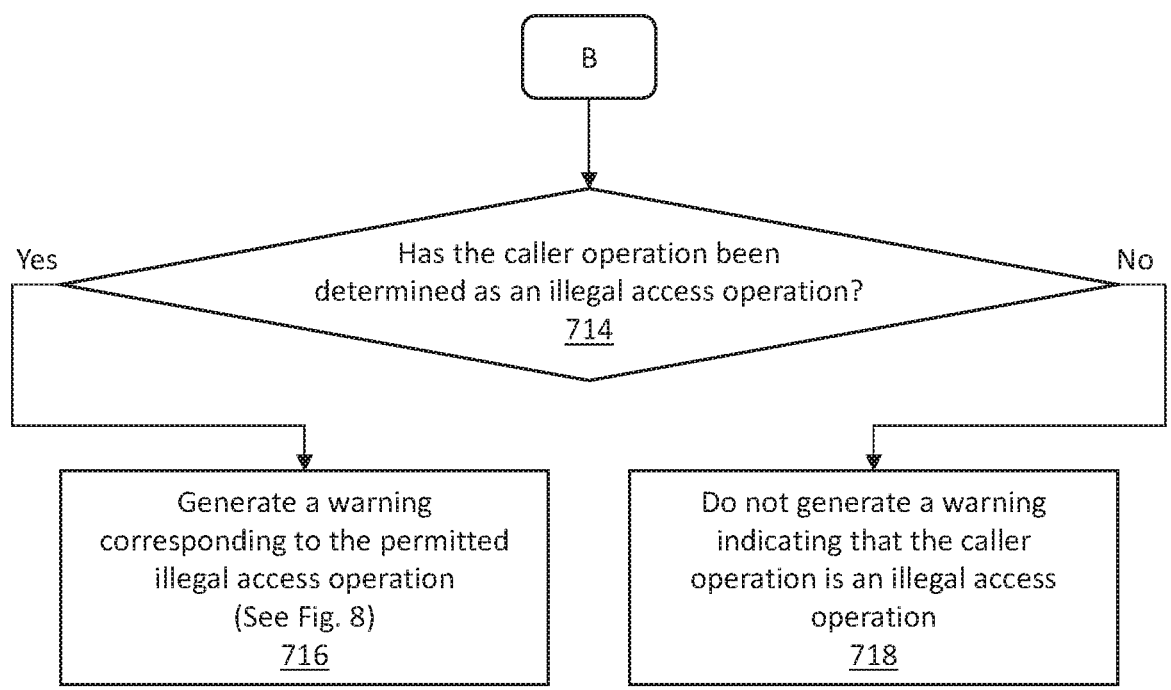

FIGS. 7A-C illustrate an example set of steps for identifying permitted illegal access operations in a module system, in accordance with one or more embodiments. One or more steps illustrated in FIGS. 7A-C may be modified, rearranged, or omitted all together. Accordingly, the particular sequence of steps illustrated in FIGS. 7A-C should not be construed as limiting the scope of one or more embodiments. The same description applies to steps that are labeled with the same number across FIG. 6 and FIGS. 7A-C.

In an embodiment, strict enforcement of modular-level accessibility and/or language-level accessibility is overridden, as described below with reference to FIGS. 7A-C, if there is a configuration to identify and generate warnings corresponding to permitted illegal access operations. The configuration to identify and generate warnings corresponding to permitted illegal access operations may be defined in various ways, such as by a host system (e.g., via a command line option), by an explicit operation within the code, and/or by an annotation. There may be a single configuration to override both modular-level access checks and language-level access checks. Alternatively, there may be a configuration to override modular-level access checks and a separate configuration to override language-level access checks.

One or more embodiments include determining whether there is a configuration to override modular-level access checks during execution of a set of modules (Step 701). As described above in Section 3.3.3, the configuration may be defined in various ways, such as by a host system (e.g., via a command line option), by an explicit operation within the code, and/or by an annotation.

In an embodiment, the configuration specifies attributes associated with operations that are permitted to override modular-level access checks. Examples of such attributes include: (a) a name of a library or framework that expresses such operations; (b) whether a particular module including such operations is an unnamed module; and (c) an attribute associated with a call stack of such operations. A name of a library or framework that expresses operations that are permitted to override modular-level access checks may include, for example, a name of method, class, interface, and/or package. An attribute associated with a call stack of the operations that are permitted to override modular-level access checks may include, for example, a particular setting associated with the operations. The setting may be imposed dynamically during runtime, at load-time, and/or during execution of code. As an example, a configuration to override modular-level access checks may indicate that code that was granted a particular security permission is allowed to override access checks.

In an embodiment, the configuration specifies attributes associated with target module elements that are permitted to be accessed via overriding modular-level access checks. Examples of such attributes include: (a) a name of a library or framework that expresses such target module elements; and (b) a particular access modifier associated with such target module elements.

In an embodiment, the configuration is set by an operation within the caller module. The operation identifies one or more module elements (including the target module element) for which any subsequent modular-level access checks are to be suppressed. As an example, a caller module may include an operation that suppresses modular-level access checks for all module elements.

If there is no configuration to override modular-level access checks, then Steps 602, 604, 606, and 612 are performed as described above in Section 5.

If there is a configuration to override modular-level access checks, then one or more embodiments include determining modular encapsulation boundaries indicating that one or more types of the set of modules are exposed (Step 702). The runtime environment 113 may determine modular encapsulation boundaries indicating that all types of the set of modules are exposed. Alternatively, the runtime environment 113 may determine modular encapsulation boundaries indicating that a subset of types of the set of modules are exposed. Which types to determine as exposed may be specified via a configuration. The runtime environment 113 does not determine the modular encapsulation boundaries based on the exposure of types indicated by the module declarations of the set of modules. Regardless of the exposure of types indicated by the module declarations of the set of modules, the runtime environment 113 acts as if one or more types of the set of modules are exposed based on a configuration.

One or more embodiments include identifying a caller operation of a caller module that attempts to access a target module element of a target module (Step 604). Step 604 is performed as described above in Section 5.

One or more embodiments include determining whether a module declaration of the target module exposes the type which encloses the target module element to the caller module (Step 706). The runtime environment 113 analyzes the module declaration of the target module itself to determine whether the module declaration of the target module exposes the type that encloses the target module element to the caller module. The runtime environment 113 cannot rely on the modular encapsulation boundaries determined at Step 702 since the modular encapsulation boundaries were determined without reference to the module declarations.

If the module declaration of the target module does not expose the type which encloses the target module element to the caller module, then the runtime environment 113 determines the caller operation as an illegal access operation (Step 707).

One or more embodiments include determining whether one or more access modifiers associated with the target module element render the target module element accessible to the type including the caller operation (Step 608). Step 608 is performed as described above in Section 5.

If access modifiers associated with the target module element render the target module element accessible, one or more embodiments include permitting access to the target module element (Step 610). Step 610 is performed as described above in Section 5.

If access modifiers associated with the target module element do not render the target module element accessible, then one or more embodiments include determining whether there is a configuration to override language-level access checks during executing of the set of modules (Step 709). As described above in Section 4, the configuration may be defined in various ways, such as by a host system (e.g., via a command line option), by an explicit operation within the code, and/or by an annotation.

In an embodiment, the configuration to override language-level access checks is set by an operation within the caller module. The operation identifies one or more module elements (including the target module element) for which any subsequent language-level access checks are to be suppressed. As an example, the operation may be a setAccessible operation provided by the libraries of the Java Platform.

In an embodiment, the operation identified at Step 604 (which is, the operation attempting to make an illegal access) is an operation to set the configuration to override access checks. In this case, at Step 709, the system may determine that there is a configuration to override access checks based on the operation identified at Step 604. Based on the configuration, the operation identified at Step 604 is permitted.

In an embodiment, Steps 608-610 are performed prior to Step 706 or Step 606. The system performs a check on language-level accessibility before modular-level accessibility. If (a) access modifiers associated with the target module element render the target module element in accessible, and (b) there is no overriding configuration, then access to the target module element is denied merely based on the language-level check, regardless of what packages are exposed by the module declaration of the target module.

As described above, the particular sequence of steps illustrated in FIGS. 7A-C should not be construed as limiting the scope of one or more embodiments. Operation 709 may be performed subsequent to Operation 608; or, Operation 608 may be performed subsequent to Operation 709. Operation 608 may be performed subsequent to Operation 706 or Operation 606; or, Operation 706 or Operation 606 may be performed subsequent to Operation 608.

If there is no configuration to override language-level access checks, then one or more embodiments include prohibiting access to the target module element (Step 612). Step 612 is performed as described above in Section 5.

If there is a configuration to override language-level access checks, then one or more embodiments include determining the caller operation as an illegal access operation (Step 711). Then, one or more embodiments include permitting access to the target module element (Step 610). Step 610 is performed as described above in Section 5.

One or more embodiments include determining whether the caller operation has been determined as an illegal access operation (Step 714). The runtime environment 113 checks whether the caller operation has been determined as an illegal access operation based on Step 707 and/or Step 711.

If the caller operation has been determined as an illegal access operation, then one or more embodiments include generating a warning corresponding to the permitted illegal access operation (Step 716). Examples of steps for generating warnings corresponding to permitted illegal access operations are described below with reference to FIG. 8. The warning may be generated and/or presented concurrently while performing Step 707 and/or Step 711. The warning may be generated prior to or subsequent to permitting access to the target module element at Step 610.

If the caller operation has not been determined as an illegal access operation, then one or more embodiments include refraining from generating a warning indicating that the caller operation is an illegal access operation (Step 718).

Figure 8:
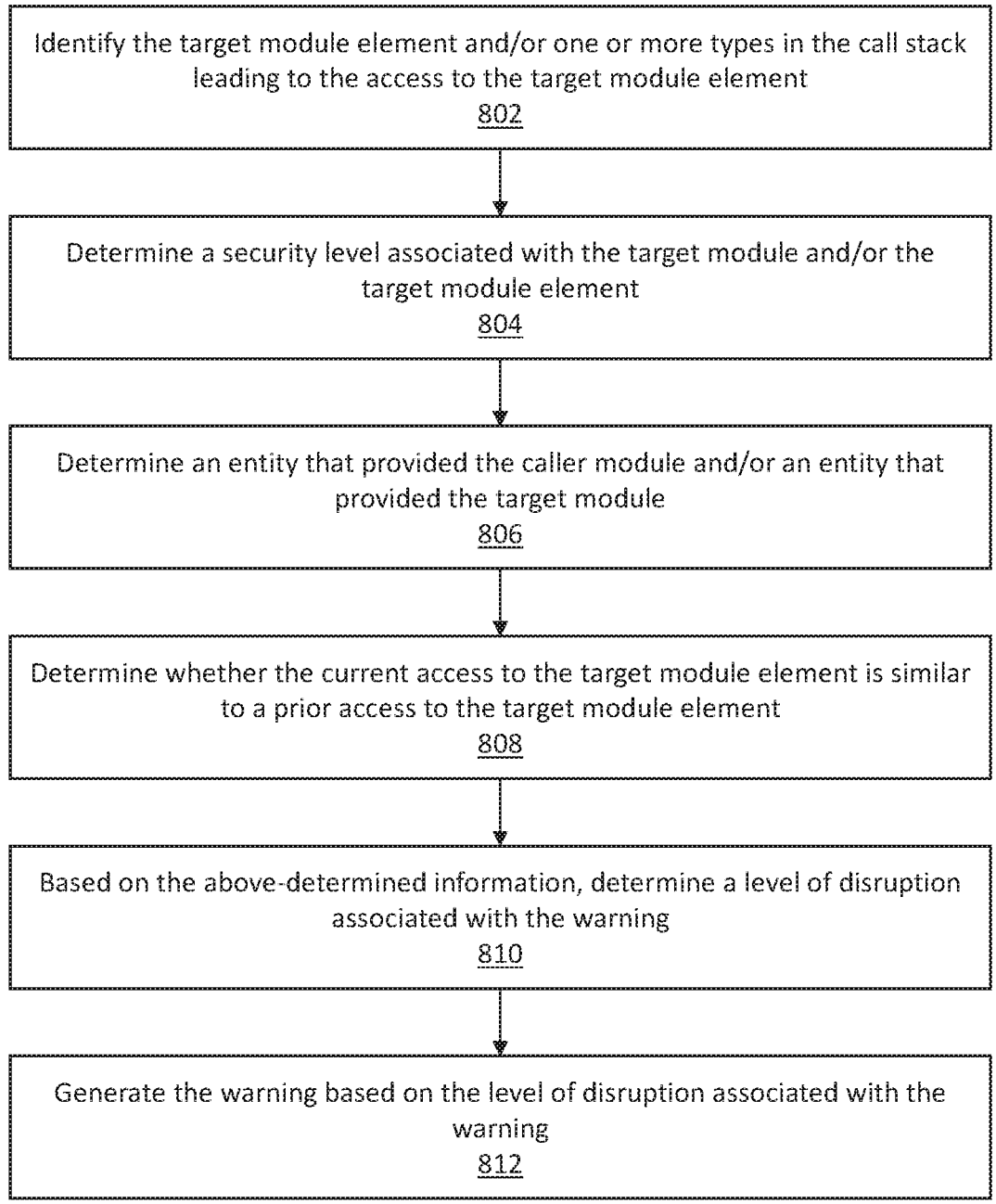
FIG. 8 illustrates an example set of steps for generating warnings corresponding to permitted illegal access operations, in accordance with one or more embodiments.

FIG. 8 illustrates an example set of steps for generating warnings corresponding to permitted illegal access operations, in accordance with one or more embodiments. One or more steps illustrated in FIG. 8 may be modified, rearranged, or omitted all together. Accordingly, the particular sequence of steps illustrated in FIG. 8 should not be construed as limiting the scope of one or more embodiments.

A permitted illegal access operation is associated with one or more attributes. Steps 802-808 are steps for determining examples of attributes associated with a permitted illegal access operation. Additional and/or alternative attributes may be used. The attributes may be used to determine a level of disruption associated with a particular warning. Additionally or alternatively, the attributes may be used to determine the content of a particular warning. In an embodiment, a configuration may specify the attributes to be used, the level of disruption associated with a particular warning, and/or the content of a particular warning. The configuration may be defined in various ways, such as by a host system (e.g., via a command line option), by an explicit operation within the code, and/or by an annotation.

One or more embodiments include identifying the target module element and/or one or more types in the call stack leading to the access to the target module element (Step 802). In an embodiment, Step 802 is performed concurrently with Step 706 and/or Step 711. The runtime environment 113 captures the call stack (or part thereof) of the thread associated with the caller operation that attempts to access the target module element. The runtime environment 113 generates an identifier describing the target module element, such as, a string representation of: the target module element's declaring type, the target module element's name, and/or the target module element's parameters. Additionally or alternatively, the runtime environment 113 generates an identifier describing the caller operation. Additionally or alternatively, the runtime environment 113 identifies an index into the code array of the "Code" attribute including the execution point represented by the stack frame. The "Code" attribute is stored in a class file, and may be stored as part of a method structure of a class file. The "Code" attribute contains the Java Virtual Machine instructions and auxiliary information for a method. The code array gives the actual bytes of Java Virtual Machine code that implement the method. The code for a method, instance initialization method, or class or interface initialization method is stored in the code array of the Code attribute.

The runtime environment 113 may inspect deeper into the call stack to identify another operation that called the caller operation that attempts to access the target module element. The runtime environment 113 may continue to inspect the call stack to determine any number of types that led to the access to the target module element.

One or more embodiments include determining a security level associated with the target module and/or target module element (Step 804). As an example, a module that is built into the compile-time environment and/or runtime environment 113 may be associated with a high security level. A module that is included in a runtime image may be associated with a high security level. A module that provides security services or provides access to highly sensitive data may be associated with a high security level. A module that is associated with a high security annotation may be associated with a high security level. All other modules may be associated with a low security level.

As another example, the runtime environment 113 may determine the security level based on the access modifiers associated with the target module element. For example, a private field in non-public class in a non-exported package may be associated with higher security level than a public field of a public class in a non-exported package.

One or more embodiments include determining an entity that provided the caller module and/or an entity that provided the target module (Step 806). The entity may be an individual, a corporation, and/or other organization. In an embodiment, a modular artifact and/or packaged library including a particular module indicates an entity that provided the particular module. The runtime environment 113 inspects the modular artifact and/or packaged library corresponding to the caller module and/or target module to determine an entity that provided the caller module and/or target module. The packaged library may be, for example, a JAR file on a class path.

In an embodiment, the runtime environment 113 tracks where each module has been loaded from. A module may be loaded over a network connection, for example. Based on the source of a module, the runtime environment 113 determines an entity that provided the module.

In an embodiment, a database stores a mapping between modules and entities that provided the modules. The runtime environment 113 refers to the database to determine an entity that provided the caller module and/or target module.

One or more embodiments include determining whether the current access to the target module element is duplicative of and/or similar to a prior access to the target module element (Step 808). In an embodiment, the runtime environment 113 captures the call stack of the thread associated with the caller operation that attempts to access the target module element, as described above with reference to Step 802. The runtime environment 113 performs a reduction on the number of stack frames that were captured. As an example, the runtime environment 113 drops the initial stack frames, which are likely to represent the caller operation and other operations within the same library. The remaining stack frames are used to generate a hash. The hash may be based on information from each stack frame, such as (a) the name of the method represented by the stack frame, (b) the declaring "Class" for said method, and/or (c) the index into the code array of the "Code" attribute including the execution point represented by the stack frame.

Based on the identifier for the target module element and/or the hash of the pertinent stack frames, the runtime environment 113 determines whether the calling code was previously permitted to perform an illegal access of the target module element. Additionally or alternatively, the runtime environment 113 determines whether the calling code is similar to a previous call to the target module element.

One or more embodiments include determining a level of disruption associated with the warning based on the information determined at one or more of Steps 802-808, Steps 602-612, and/or Steps 701-718 (Step 810). The level of disruption may be defined by (a) what information to include in the warning, (b) one or more locations at which to present the warning, (c) whether to provide a user prompt or dialog, and/or (d) how long to stall before executing the caller operation that attempts to access the target module element.

Examples of information to present in the warning include: any of the attributes identified at Steps 802-808, a type including the caller operation that attempts to access the target module element, a modular artifact including the caller operation that attempts to access the target module element, whether the module declaration associated with the target module exposes the target module element, and/or one or more access modifiers associated with the target module element. The warning may include one or more types that are in the call stack captured at Step 802. The number of types in the call stack to include in the warning may be set using a configuration. The warning may include the specific bytecode or the point in a method that performs the illegal access to the target module element (based on the index into the code array of the "Code" attribute including the execution point represented by the stack frame).

Examples of locations at which to present the warning include: a log file, a messaging service, and a user interface rendered by the application that executes the caller operation that attempts to access the target module element. In an example, a runtime environment 113 may determine that there are no locations at which to present the warning. Based on this example, the runtime environment 113 does not generate any warning corresponding to the caller operation that attempts to access the target module element. The runtime environment 113 may determine not to generate a warning if, for example, the calling code to the target module element is the same as or similar to a previous call to the target module element.

Examples of user prompts or dialogs include a user prompt or dialog that asks the user whether to permit the identified illegal access operation. The user prompt or dialog is presented prior to permitting the identified illegal access operation. The runtime environment 113 may wait a threshold time period for the user to respond. The identified illegal access operation is permitted or not permitted based on the user's response. If the user does not permit the identified illegal access operation, then Step 610 of FIG. 7 is not performed. Access to the target module element is prohibited. If the user does not respond within the threshold time period, then the runtime environment 113 may perform a default step, such as permitting the identified illegal access operation.

The runtime environment 113 may stall prior to executing the caller operation that attempts to access the target module element. The runtime environment 113 may stall for a particular number of processor cycles. Additionally or alternatively, the runtime environment 113 may stall for a particular period of time. In an embodiment, the length of time to stall prior to executing the caller operation may vary based on how long ago the module system was introduced and/or how long ago the operations to identify permitted illegal access operations were introduced. The length of time to stall may increase over time in order to provide increased incentive for developers to revise code that performs illegal access operations.

One or more embodiments include generating the warning corresponding to the permitted illegal access operation based on the level of disruption associated with the warning (Step 812). The warning is presented in a log file, through a messaging service, through a user interface rendered by the application that executes the caller operation that attempts to access the target module element, and/or another location.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of steps comprising:
   identifying an operation, expressed in a first module of a plurality of modules, that attempts to access a module element of a second module of the plurality of modules;
   wherein modular-level accessibility to each of the plurality of modules is defined at least in part by a respective declaration associated with each of the plurality of modules;
   determining that a declaration, associated with the second module, does not expose the module element of the second module to the first module;
   responsive to determining that the operation attempts to access the module element that has not been exposed by the second module to the first module, determining that the access by the operation to the module element is illegal;
   determining that access checks are overridden for at least one of: (a) accesses by operations that are associated with a first set of one or more attributes and (b) accesses to target module elements that are associated with a second set of one or more attributes;
      wherein the first set of attributes comprises at least one of:
         (i) a first name of a first library or first framework that expresses the operations making the accesses;
         (ii) whether one or more modules including the operations is an unnamed module; and
         (iii) an attribute associated with a call stack of the operations;
      wherein the second set of attributes comprising at least one of:
         (i) a second name of a second library or second framework that expresses the target module elements being accessed; and
         (ii) a particular access modifier associated with the target module elements;
   responsive to determining at least one of: (a) the operation is associated with at least one of the first set of attributes and (b) the module element of the second module is associated with at least one of the second set of attributes:
      permitting the operation to perform an illegal access to the module element of the second module; and
      generating a warning indicating the illegal access.

2. The medium of claim 1, wherein:
   the steps further comprise: determining, based on an access modifier associated with the module element, that the module element is not accessible to the operation; and
   the warning indicates that (a) the declaration, associated with the second module, does not expose the module element of the second module to the first module, and (b) based on the access modifier associated with the module element, the module element is not accessible to the operation.

3. The medium of claim 1, wherein a configuration that overrides subsequent access checks for the module element is set by another operation expressed in the first module.

4. The medium of claim 1, wherein permitting the operation to access the module element is further responsive to determining that a configuration exists to override access checks for at least one of: (a) the accesses by the operations that are associated with the first set of attributes and (b) the accesses to the target module elements that are associated with the second set of attributes.

5. The medium of claim 1, wherein generating the warning occurs prior to permitting the operation to access the module element.

6. The medium of claim 1, wherein generating the warning occurs subsequent to permitting the operation to access the module element.

7. The medium of claim 1, wherein the warning identifies at least one of:
   (a) the operation, expressed in the first module, that attempts to access the module element of the second module;
   (b) the module element that has not been exposed to the first module;
   (c) a type including the operation that attempts to access the module element of the second module;
   (d) a modular artifact including the operation that attempts to access the module element of the second module;
   (e) whether a module declaration associated with the second module exposes the module element to the first module;
   (f) one or more access modifiers associated with the module element of the second module;
   (g) a security level associated with the second module;
   (h) one or more types, in a call stack, leading to an access to the module element of the second module by the operation expressed in the first module;
   (i) a first entity that provided the first module;
   (j) a second entity that provided the second module; and
   (k) whether the access to the module element is same as or similar to a prior access to the module element.

8. The medium of claim 1, wherein the steps further comprise: receiving a configuration that specifies a level of disruption associated with the warning, wherein the level of disruptiveness is based on at least one of:
   (a) an amount of information to include in the warning;
   (b) one or more locations at which the warning is presented;
   (c) whether to provide a user prompt or dialog; and (d) a number of processor cycles or a duration of time to stall prior to executing the operation that attempts to access the module element.

9. The medium of claim 1, wherein the steps further comprise:
   determining one or more attributes associated with at least one of the module element, the first module, and the second module;
   determining a level of disruption associated with the warning based on the attributes; and
   generating the warning based on the determined level of disruption.

10. The medium of claim 1, wherein the steps comprise:
    determining that access checks are overridden for accesses by operations that are expressed in the first library or framework;
    determining that the operation is expressed in the first library or framework.

11. The medium of claim 1, wherein the steps comprise:
    determining that access checks are overridden for accesses by operations that are included in the unnamed module;
    determining that the operation is included in the unnamed module.

12. The medium of claim 1, wherein the steps comprise:
    determining that access checks are overridden for accesses by operations that are not included in the unnamed module;
    determining that the operation is not included in the unnamed module.

13. The medium of claim 1, wherein the steps comprise:
    determining that access checks are overridden for accesses by operations that are associated with call stacks having a particular attribute;
    determining that the operation is associated with a call stack having the particular attribute.

14. The medium of claim 1, wherein the steps comprise:
    determining that access checks are overridden for accesses to target module elements that are expressed in the second library or framework;
    determining that the module element is expressed in the second library or framework.

15. The medium of claim 1, wherein the steps comprise:
    determining that access checks are overridden for accesses to target module elements that are associated with the particular access modifier;
    determining that the module element is associated with the particular access modifier.

16. The medium of claim 1, wherein the steps further comprise:
    obtaining a configuration overriding the access checks for at least one of: (a) the accesses by the operations that are associated with the first set of attributes and (b) the accesses to the target module elements that are associated with the second set of attributes.

17. A system, comprising:
    one or more hardware processors; and
    one or more non-transitory computer-readable media storing instructions, which when executed by the one or more hardware processors, cause execution of steps comprising:
    identifying an operation, expressed in a first module of a plurality of modules, that attempts to access a module element of a second module of the plurality of modules;
    wherein modular-level accessibility to each of the plurality of modules is defined at least in part by a respective declaration associated with each of the plurality of modules;
    determining that a declaration, associated with the second module, does not expose the module element of the second module to the first module;
    responsive to determining that the operation attempts to access the module element that has not been exposed by the second module to the first module, determining that the access by the operation to the module element is illegal;
    determining that access checks are overridden for at least one of: (a) accesses by operations that are associated with a first set of one or more attributes and (b) accesses to target module elements that are associated with a second set of one or more attributes;
    wherein the first set of attributes comprises at least one of:
       (i) a name of a library or framework that expresses the operations making the accesses;
       (ii) whether one or more modules including the operations is an unnamed module; and
       (iii) an attribute associated with a call stack of the operations;
    wherein the second set of attributes comprising at least one of:
       (i) a name of a library or framework that expresses the target module elements being accessed; and
       (ii) a particular access modifier associated with the target module elements;
    responsive to determining at least one of: (a) the operation is associated with at least one of the first set of attributes and (b) the module element of the second module is associated with at least one of the second set of attributes:
       permitting the operation to perform an illegal access to the module element of the second module; and
       generating a warning indicating the illegal access.

18. The system of claim 17, wherein:
    the steps further comprise: determining, based on an access modifier associated with the module element, that the module element is not accessible to the operation; and
    the warning indicates that (a) the declaration, associated with the second module, does not expose the module element of the second module to the first module, and (b) based on the access modifier associated with the module element, the module element is not accessible to the operation.

19. The system of claim 17, wherein permitting the operation to access the module element is further responsive to determining that a configuration has been set to override access checks for at least one of: (a) the accesses by the operations that are associated with the first set of attributes and (b) the accesses to the target module elements that are associated with the second set of attributes.

20. A non-transitory computer readable medium comprising instructions which, when executed by one or more hardware processors, cause performance of steps comprising:
    identifying a first operation, expressed in a first module of a plurality of modules in a set of code, that attempts to access a module element of a second module of the plurality of modules;

wherein modular-level accessibility to each of the plurality of modules is defined at least in part by a respective declaration associated with each of the plurality of modules;
wherein language-level accessibility to module elements of the plurality of modules is defined at least in part by at least one of: (a) a respective access modifier associated with each of the module elements and (b) a respective access modifier associated with each type including each of the module elements;
determining, based on at least one of: (a) a first access modifier associated with the module element and (b) a second access modifier associated with a type including the module element, that the module element of the second module is not accessible to the first operation;
responsive to determining that the first operation attempts to access the module element that is not accessible, determining that the access by the first operation to the module element is illegal;
identifying a second operation, expressed in the set of code, that sets a configuration that overrides access checks for accesses to the module element of the second module;
responsive to identifying the second operation:
permitting the first operation to perform an illegal access to the module element of the second module; and
generating a warning indicating the illegal access.

21. The medium of claim 20, wherein identifying the second operation occurs before identifying the first operation.

22. The medium of claim 20, wherein the second operation is expressed in the first module.

23. The medium of claim 20, wherein permitting the operation to access the module element is further responsive to determining that the configuration exists to permit the first operation to perform an access to the module element notwithstanding the access being illegal.

24. The medium of claim 20, wherein the steps further comprise:
determining that a declaration, associated with the second module, exposes the module element of the second module to the first module.

25. The medium of claim 20, wherein the steps further comprise:
determining that a declaration, associated with the second module, does not expose the module element of the second module to the first module.

26. The medium of claim 20, wherein the second access modifier associated with the type including the module element indicates which types may access the type including the module element.

27. The medium of claim 20, wherein the first access modifier associated with the module element indicates which types may access the module element.

28. A non-transitory computer readable medium comprising instructions which, when executed by one or more hardware processors, cause performance of steps comprising:
identifying a first operation, expressed in a first module of a plurality of modules, that attempts to access a first module element of a second module of the plurality of modules;
wherein modular-level accessibility to each of the plurality of modules is defined at least in part by a respective declaration associated with each of the plurality of modules;
determining that a first declaration, associated with the second module, does not expose the module element of the second module to the first module;
responsive to determining that the first operation attempts to access the first module element that has not been exposed by the second module to the first module, determining that access by the first operation to the first module element is illegal;
permitting the first operation to perform a first illegal access to the first module element of the second module;
determining a first level of disruption associated with a first warning indicating the first illegal access based on a first attribute associated with at least one of: the first operation, the first module element, the first module, and the second module;
generating a first warning, associated with the first level of disruption, indicating the first illegal access;
identifying a second operation, expressed in a third module of the plurality of modules, that attempts to access a second module element of a fourth module of the plurality of modules;
determining that a second declaration, associated with the fourth module, does not expose the second module element of the fourth module to the third module;
responsive to determining that the second operation attempts to access the second module element that has not been exposed by the fourth module to the third module, determining that access by the second operation to the second module element is illegal;
permitting the second operation to perform a second illegal access to the second module element of the fourth module;
determining a second level of disruption associated with a second warning indicating the second illegal access based on a second attribute associated with at least one of: the second operation, the second module element, the third module, and the fourth module;
wherein the first level of disruption and the second level of disruption are different;
generating a second warning, associated with the second level of disruption, indicating the second illegal access.

29. The medium of claim 28, wherein:
the first level of disruption is defined by at least one of:
(a) a first amount of information to include in the first warning;
(b) a first set of one or more locations at which the first warning is presented;
(c) whether to provide a first user prompt or dialog;
the second level of disruption is defined by at least one of:
(a) a second amount of information to include in the second warning, wherein the second amount of information is different than the first amount of information;
(b) a second set of one or more locations at which the second warning is presented, wherein the second set of locations is different than the first set of locations;
(c) whether to provide a second user prompt or dialog.

30. The medium of claim 28, wherein:
the first level of disruption is defined by a first number of processor cycles or a first duration of time to stall prior to executing the first operation that attempts to access the first module element;
the second level of disruption is defined by a second number of processor cycles or a second duration of time to stall prior to executing the second operation that attempts to access the second module element;

wherein the second number of processor cycles or the second duration of time is different than the first number of processor cycles or the first duration of time.

* * * * *